Figure 24:
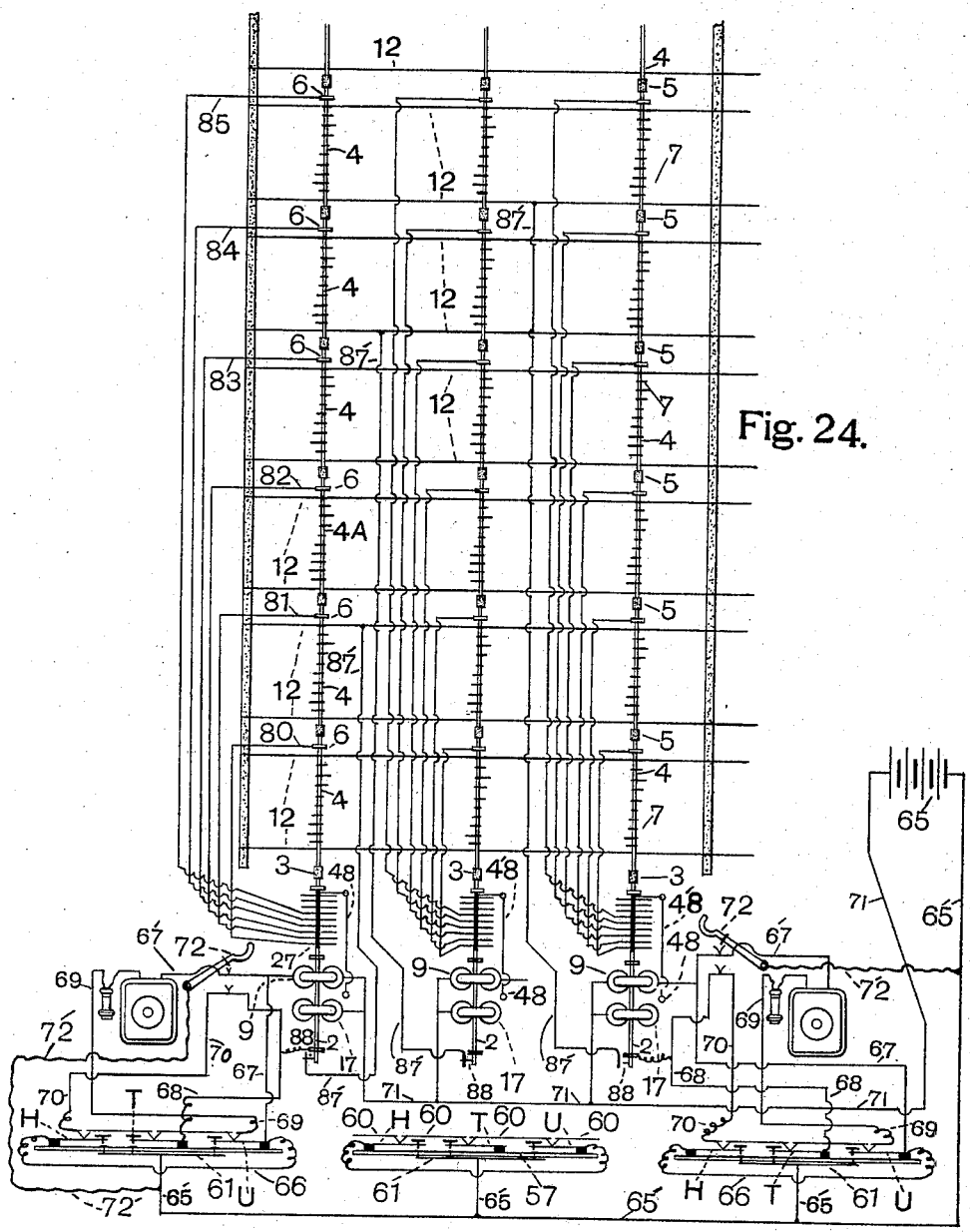

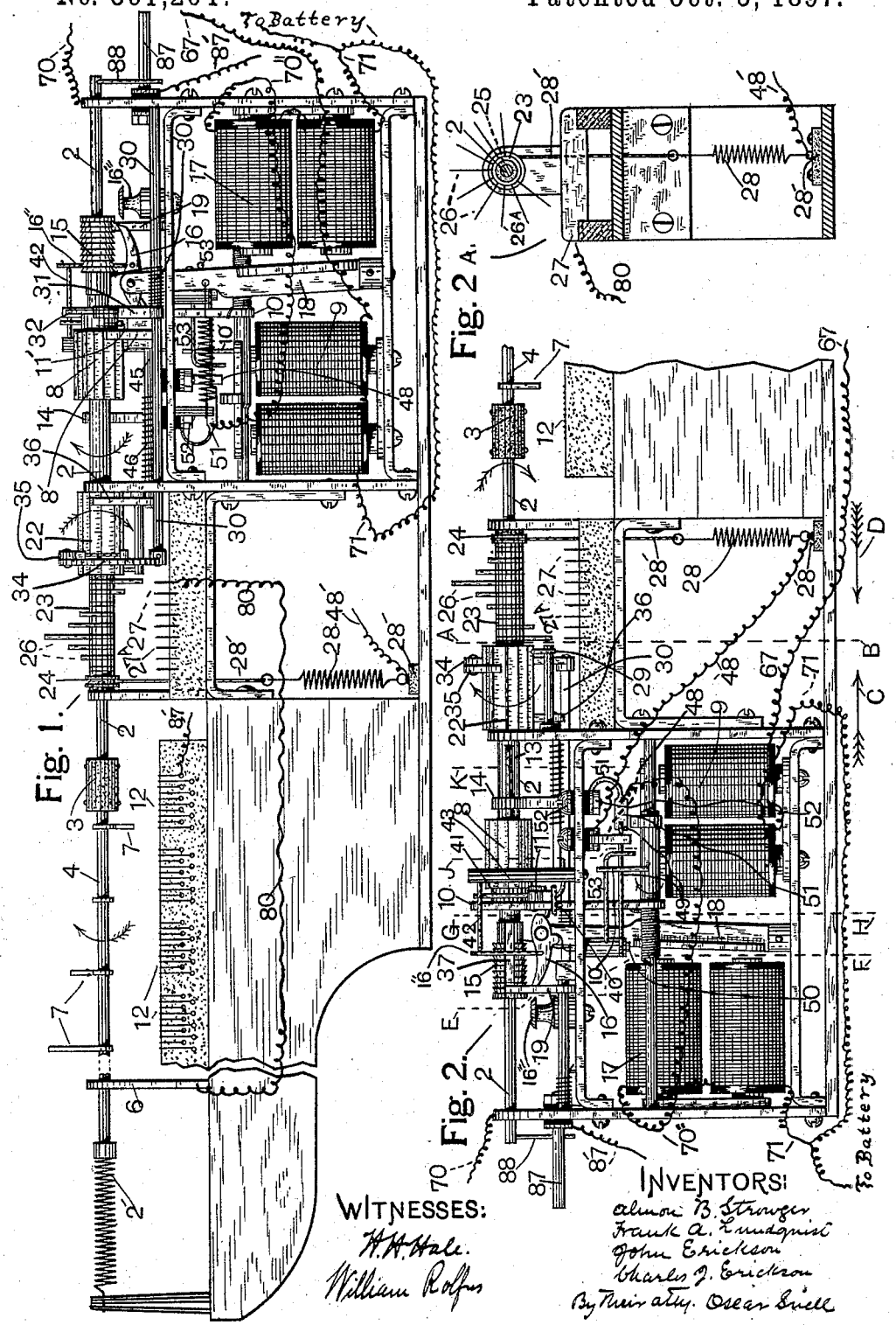

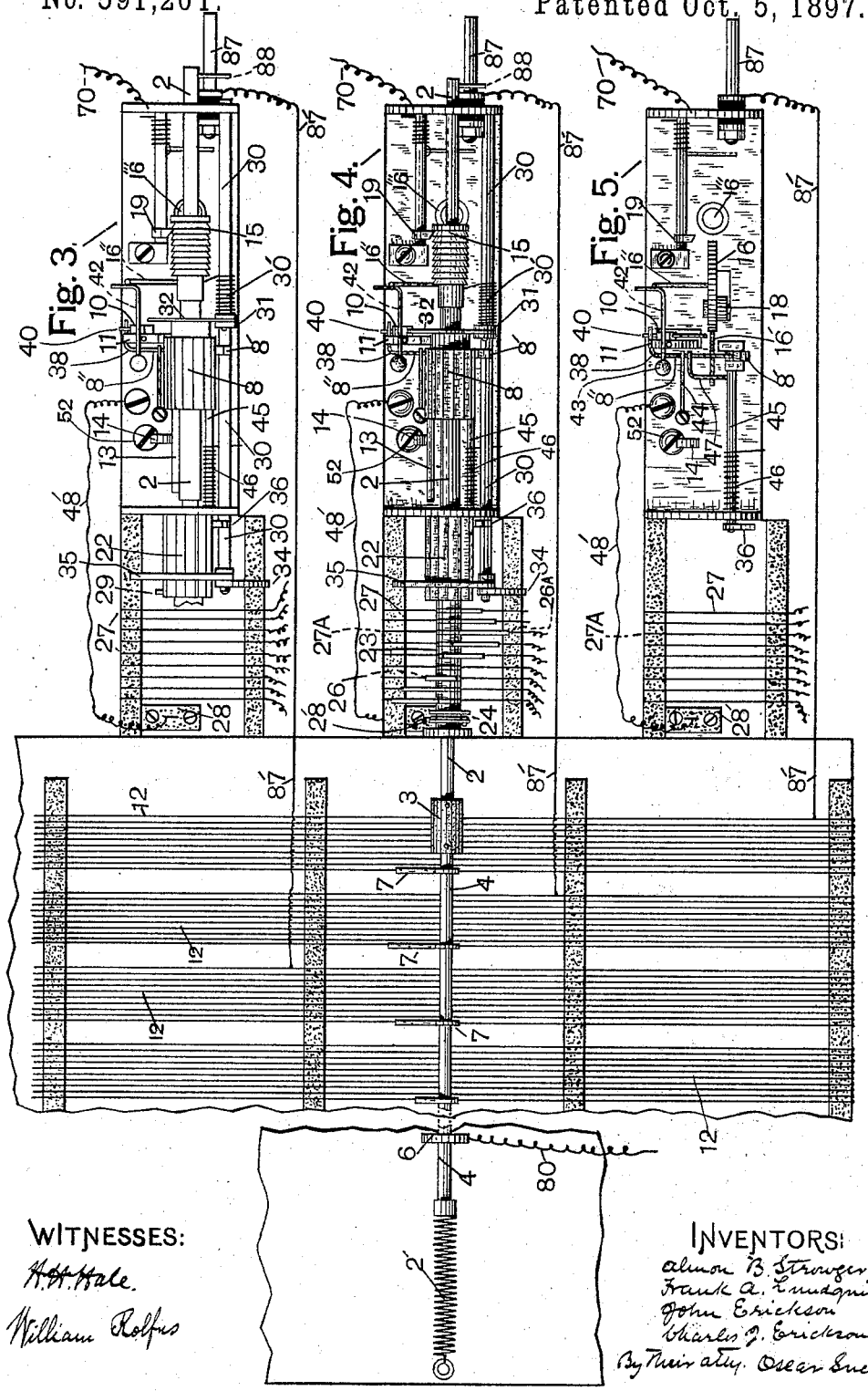

(No Model.) 6 Sheets—Sheet 3.
A. B. STROWGER, F. A. LUNDQUIST & J. & C. J. ERICKSON.
ELECTRICAL EXCHANGE.
No. 591,201. Patented Oct. 5, 1897.
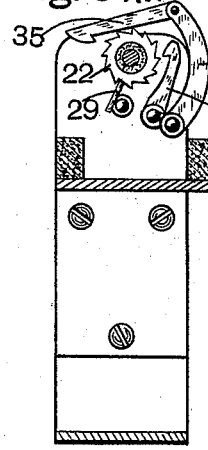
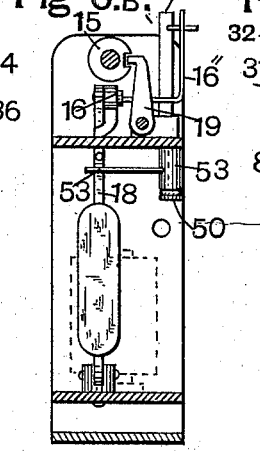
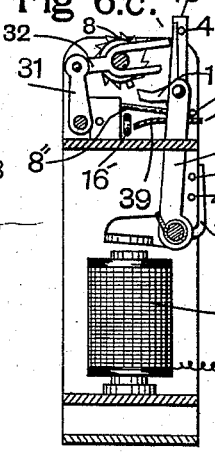
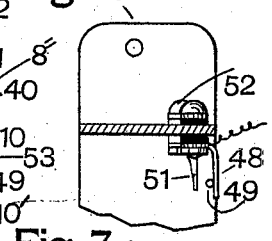
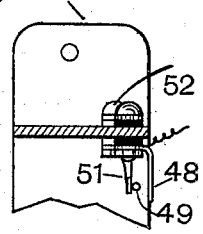
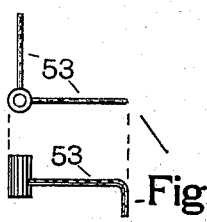
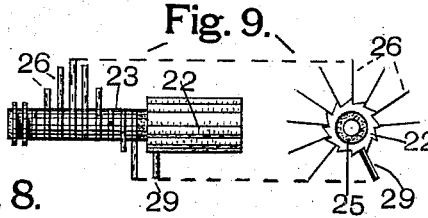
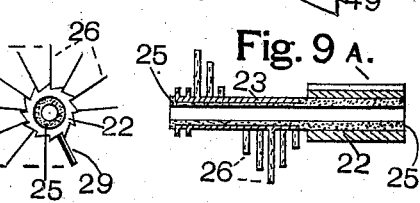
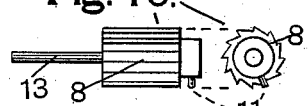
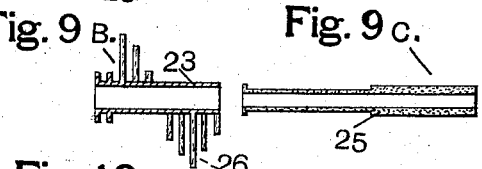
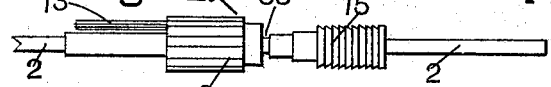
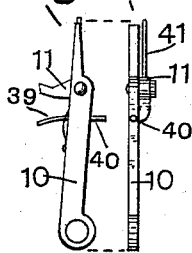
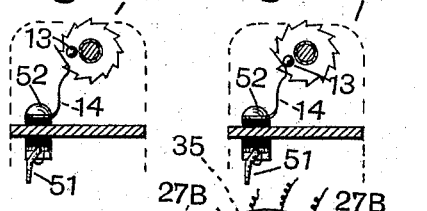
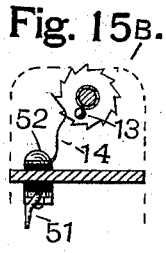
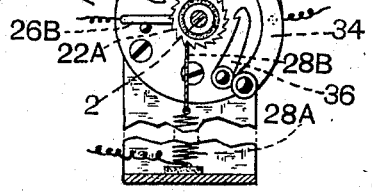
WITNESSES:
H. H. Hale
William Rolfus
INVENTORS:
Almon B. Strowger
Frank A. Lundquist
John Erickson
Charles J. Erickson
By their atty. Oscar Snell

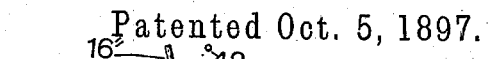
(No Model.) 6 Sheets—Sheet 4.
A. B. STROWGER, F. A. LUNDQUIST &
J. & C. J. ERICKSON.
ELECTRICAL EXCHANGE.
No. 591,201. Patented Oct. 5, 1897.
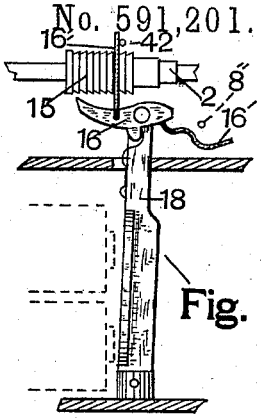
Fig. 17.
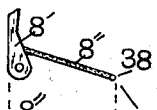
Fig. 18.
Fig. 17 A.
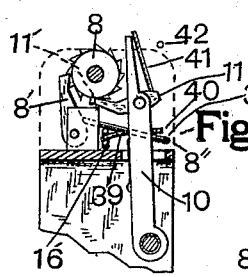
Fig. 19 A.
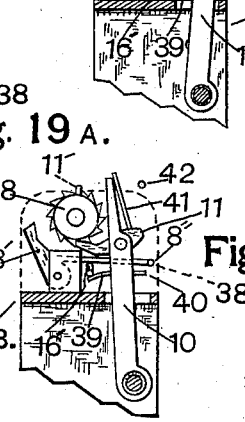
Fig. 19.
Fig. 20.
Fig. 19 B.
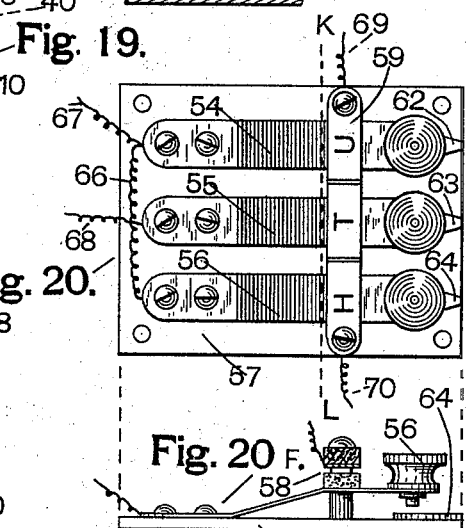
Fig. 20 F.
Fig. 20 A.
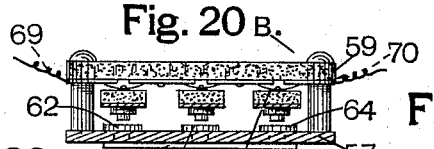
Fig. 20 B.
Fig. 20 C.
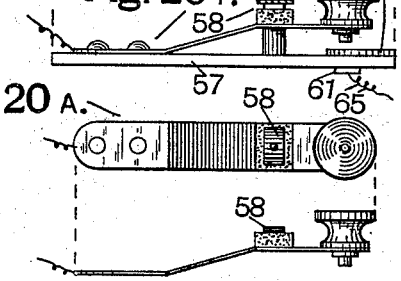
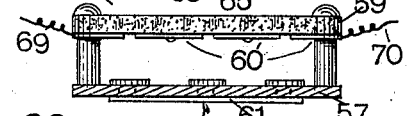
Fig. 20 D.
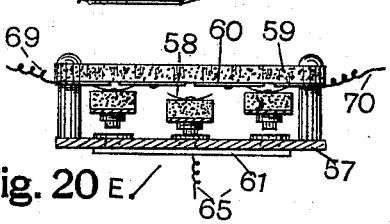
Fig. 20 E.
WITNESSES:
H. H. Hale.
William Rolfus.
INVENTORS:
Almon B. Strowger.
Frank A. Lundquist
John Erickson
Charles J. Erickson
By Their atty. Oscar Snell.

(No Model.) 6 Sheets—Sheet 5.
A. B. STROWGER, F. A. LUNDQUIST &
J. & C. J. ERICKSON.
ELECTRICAL EXCHANGE.
No. 591,201. Patented Oct. 5, 1897.
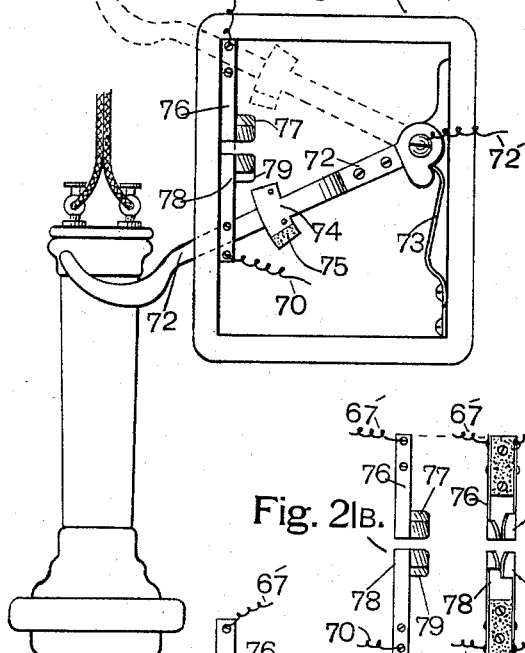
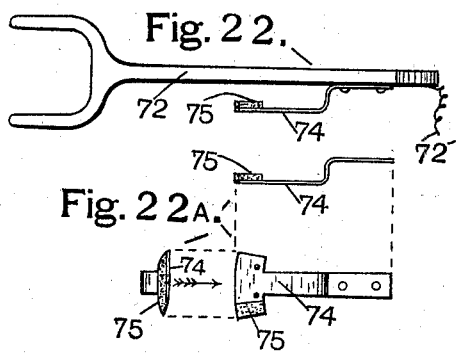
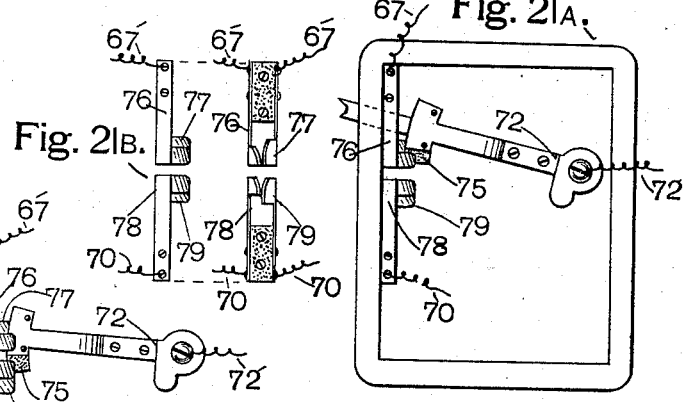
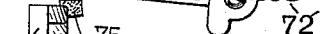
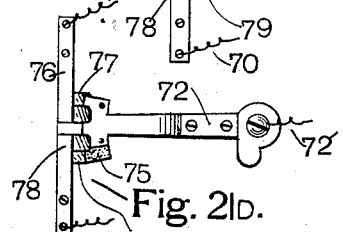
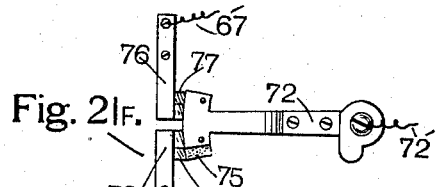
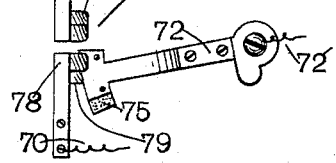
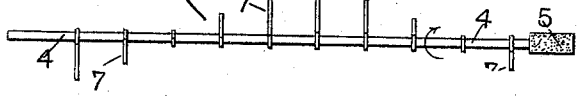
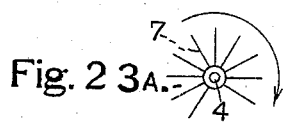
WITNESSES:
H. H. Hale.
William Rolfes.
INVENTORS:
Almon B. Strowger
Frank A. Lundquist
John Erickson
Charles J. Erickson
By their atty. Oscar Snell.

UNITED STATES PATENT OFFICE.

ALMON B. STROWGER, FRANK A. LUNDQUIST, JOHN ERICKSON, AND CHARLES J. ERICKSON, OF CHICAGO, ILLINOIS, ASSIGNORS TO THE STROWGER AUTOMATIC TELEPHONE EXCHANGE, OF SAME PLACE.

ELECTRICAL EXCHANGE.

SPECIFICATION forming part of Letters Patent No. 591,201, dated October 5, 1897.

Application filed July 17, 1895. Serial No. 556,229. (No model.)

*To all whom it may concern:*

Be it known that we, ALMON B. STROWGER, FRANK A. LUNDQUIST, JOHN ERICKSON, and CHARLES J. ERICKSON, citizens of the United States, residing at Chicago, in the county of Cook and State of Illinois, have invented a new and useful Electrical Exchange, of which the following is a specification.

Our invention relates to automatic telephone-exchanges; and our objects are to simplify a portion of the mechanism of the electrical exchange embodied in Letters Patent of the United States granted to Alexander E. Keith, Frank A. Lundquist, John Erickson, and Charles J. Erickson, No. 540,168, dated May 28, 1895, and to add thereto mechanism in combination with means at the telephone-station whereby the operative parts of each exchange may be automatically released from the position in which two telephones are connected to the normal or initial position; and another object is to provide the means whereby each exchange may be made to more quickly connect any two of a great number of telephones than is practical with the mechanism embodied in the invention hereinbefore mentioned; and still another object is to so combine the system of wires connecting the make and break circuit mechanism at the telephone-station with make and break circuit mechanism at the central exchange that the number of such wires is reduced to the minimum without the use of such objectionable expedient as polarized magnets, reverse currents, &c., all of which is fully described hereinafter and is illustrated in the accompanying drawings, in which—

Figure 1 is a side elevation of the principal parts of the operative mechanism in the initial position. Fig. 2 is a side elevation of the opposite side from that shown in Fig. 1 of the principal parts of the operative mechanism, also in initial position. Fig. 2$^A$ is a vertical section on broken line A B, Fig. 2, looking in the direction indicated by arrow C. Figs. 3, 4, and 5 are plan views of the frames of three different exchanges attached to the interconnecting wire cable, with Fig. 4 having the operative mechanism attached complete and in the initial position, while Fig. 3 shows but a portion of the operative parts, which are in a changed position from what is shown in Fig. 4 and will be hereinafter fully described. Fig. 5 is a plan with the main shaft removed to show several minor parts which are explained hereinafter in full view. Fig. 6$^A$ is a vertical section on broken line A B, Fig. 2, looking in the direction indicated by arrow D. Fig. 6$^B$ is a vertical section on broken line E F, Fig. 2, looking in the direction indicated by arrow C; and Fig. 6$^C$ is a vertical section on broken line G H, Fig. 2, looking in the direction indicated by arrow C. Figs. 7 and 7$^A$ are partial vertical sections of the top portion of the frame of the exchange on broken line J and show two positions of a cut-out device. Fig. 8 shows, respectively, a plan and a side elevation of a bell-crank cut-out lever. Fig. 9 shows, respectively, a side and an end elevation of a portion of an auxiliary switch; and Fig. 9$^A$ is a vertical section thereof. Fig. 9$^B$ is a vertical section of a metal sleeve with wipers attached thereto, showing position in Fig. 9$^A$. Fig. 9$^C$ is a vertical section of a bushing of some insulating material which is shown in position in Fig. 9$^A$. Fig. 10 shows, respectively, a side and end elevation of one of the ratchet-wheels with a cut-out rod attached thereto. Fig. 11 shows, respectively, a plan and side elevation of a combined thrust and coupling piece. Fig. 12 is a side elevation of a portion of the main shaft with ratchet-wheel, Fig. 10, and thrust ratchet-cylinder, Fig. 13, mounted thereon. Fig. 14 shows, respectively, a side and front elevation of one of the ratchet-levers with pawl trip and stop attached thereto. Figs. 15$^A$ and 15$^B$ are vertical sections of a portion of the top of the exchange-frame on broken line K, Fig. 2, looking in the direction indicated by arrow B and showing several positions of the cut-out device. Fig. 16 is an elevation of a modification of the auxiliary switch shown in Figs. 1 and 9. Figs. 17 and 17$^A$ are side elevations of an actuating-lever and pawl which serve to impart a longitudinal movement to the main shaft, the pawl and lever being shown in three different positions. Fig. 18 shows, respectively, a side elevation and a plan of a detent which engages the ratchet-wheel shown in Fig. 10 and holds main shaft, Fig. 12, in the operative position. Figs. 19, 19ᴬ, and 19ᴮ show a vertical section of an upper portion of the frame on broken line G H, Fig. 2, looking in the direction indicated by arrow C, with a side elevation of lever and pawl shown in Fig. 14 in two different positions, and the detent shown in Fig. 18 in three different positions. Fig. 20 is a plan of three signal-keys which are secured to a piece of insulating material. Fig. 20ᶠ is a side elevation of the signal-keys and base shown in Fig. 20 with one side post removed. Fig. 20ᴬ shows, respectively, a plan and side elevation of one of the keys. Fig. 20ᴮ is a vertical section of the keys and base thereof on broken line K L, Fig. 20; and Fig. 20ᶜ is the same as Fig. 20ᴮ with the keys removed. Fig. 20ᴰ shows, respectively, a side elevation and a bottom plan of the top cross-piece seen in Fig. 20ᶜ. Fig. 20ᴱ is the same section as Fig. 20ᴮ, but with one of the keys shown in the depressed position. Fig. 21 is a front elevation of a system of make and break circuit mechanism which is operated by the telephone-receiver, the telephone-receiver being shown in the initial position. Fig. 21ᴬ is the same elevation as the portion shown in Fig. 21, but with the telephone-lever in the position to serve as a cut-out. Fig. 21ᴮ shows, respectively, two different elevations of the sides of the spring-contact connections, shown also in Fig. 21 in one position. Figs. 21ᶜ, 21ᴰ, 21ᴱ, and 21ᶠ show side elevations of a contact-arm of the telephone-lever in several different positions in relation to the spring-contact connections, as will be hereinafter explained. Fig. 22 is a plan view of the telephone-lever with the contact-arm secured to the side thereof; and Fig. 22ᴬ shows, respectively, a plan and an end and side elevation of this contact-arm. Figs. 22 and 23ᴬ show, respectively, a side and an end elevation of the conductor-shaft with wipers thereon arranged spirally. Fig. 24 is a diagrammatical view of the whole system to show method of wiring, and the course of the electric current.

Similar numerals and letters indicate like parts throughout the several views.

The main operating-shaft 2 in this system is mounted in the frame of the exchange and projects at both ends, and is normally free to both revolve and slide longitudinally. To one end of this shaft, Fig. 24, is attached by an insulating-coupling 3 a series of conducting-shafts 4, each coupled to the others by an insulating-coupling 5, Figs. 23 and 24, and each shaft is mounted in a bearing 6, which serves as a means of communicating electrically with each shaft independently. Each shaft is provided with a series of wipers 7, which usually comprise ten in number, but may be more or less than ten, and are arranged around the shaft in spiral order, each revolving in a different plane, as shown, and are in electrical communication with the shaft.

In Figs. 1 and 2 and on Sheet 2 of the drawings, in connection with Figs. 3, 4, and 5, are shown several groups of wires 12, which are arranged in the same plane as the revolving wipers are capable of describing, whereby each of these wires may be contacted thereby, as is hereinafter explained.

Secured to shaft 2 is an elongated ratchet-wheel 8, having the teeth so arranged on the main portion thereof that by virtue of magnet 9, lever 10, and pawl 11 the shaft may be revolved in one direction, step by step, eleven steps, without completing a revolution against the torque of helical spring 2'. At one end of ratchet-wheel 8 is a reduced portion which is provided with but one tooth 11', against which pawl 11 initially strikes to rotate shaft 2 one step when beginning the cycle of movements to connect the two telephones. There is a detent 8', which serves to retain the ratchet-wheel in position after each successive thrust of pawl 11, and this detent 8' also serves as an important factor in a train of release mechanism, which is hereinafter explained.

Attached to ratchet 8 is a pin 13, which serves as a cut-out by being thrown into and out of contact with a spring 14, which has an insulated attachment to the frame of the exchange. Ratchet-cylinder 15 is secured to shaft 2 and is provided with circumferential teeth raked in one direction, which may be engaged at any point of nearly a revolution of the cylinder by pawl 16 when impelled by virtue of magnet 17 through lever 18, this being the means of imparting a longitudinal step-by-step movement to shaft 2. There is a post 16''', Figs. 1, 2, and 17ᴬ, which serves the double purpose of a stop, against which the free end of pawl 16 contacts to limit the forward movement of the pawl, so that it cannot slide the ratchet-cylinder with shaft 2 more at each thrust than the distance between the teeth of the ratchet-cylinder, this contact of the pawl with the post also preventing the pawl from sliding out of engagement with the ratchet-cylinder at the termination of its thrust and locks the ratchet-cylinder and shaft from moving by the momentum acquired in the thrust of the pawl farther than the distance between the teeth of the ratchet-cylinder. The head on the top of the post 16''' serves to hold the pawl out of engagement with the ratchet-cylinder 15 when the parts have assumed the position shown in Fig. 17ᴬ, which will again be referred to. There is a detent 19 for retaining the ratchet-cylinder 15 with shaft 2 in the desired position after the thrust of pawl 16 against the resiliency of helical spring 2'. Figs. 2, 6ᴮ, and 13 show a groove 37 cut longitudinally at one side of ratchet-cylinder 15, so that when the cylinder is in the position shown in Figs. 2 and 6ᴮ the stop-pawl 19 is out of engagement with the notches of ratchet 15, which permits of a free longitudinal movement of shaft 2 in either direction.

Loosely mounted on shaft 2, to revolve only, is a ratchet-wheel 22 and metal sleeve 23, having a pulley 24, the ratchet-wheel and sleeve being held to revolve in unison and insulated from each other and from shaft 2 and the frame of the exchange by means of a bushing 25, Fig. 9$^C$, of insulating material. There is a series of wipers 26 arranged spirally around the sleeve 23, each adapted to revolve in a different plane from the other and each capable of contacting one at a time some one of the metal strips 27, which are held in position each independent of the other by means of insulating material and forming an auxiliary switch. A helical spring 28, which has the lower end attached to a block of insulating material 28 and the upper end to a metal cord, which is attached to the pulley 24, serves to rotate the sleeve 23 and ratchet 22 backwardly until arrested by the projection 29, Fig. 6$^A$, contacting a piece from the frame of the exchange, the spring and cord serving to establish electrical communication between sleeve 23, wipers 26, and block 28'. The means by which the wipers 26 are revolved to contact the metal strips 27 consists of a long shaft 30, mounted to partially rotate and to slide longitudinally in bearings in the frame of the exchange.

Near the center of length of shaft 30 is an arm 31, Figs. 1 and 6$^C$, to the top end of which is pivotally attached one end of the thrust and coupling piece 32, Figs. 4, 6$^C$, and 11, which is bifurcated, the arms thereof passing one above and the other below shaft 2 in a groove 33, Fig. 12, found between the end of ratchet-wheel 8 and ratchet-cylinder 15, this arrangement permitting the thrust and coupling piece 32 to slide longitudinally to vibrate the arm 31 and at the same time couple shaft 2 to shaft 30, so that although both may revolve independently they must slide longitudinally in unison.

The free end of the thrust and coupling piece 32 is in contact with lever 10 near the top thereof, Fig. 6$^C$, and is held normally in such contact by spring 30' on shaft 30, so that any inward movement of lever 10 also causes arm 31 to vibrate and shaft 30 to turn a partial revolution. Secured to the inner end of shaft 30 is an arm 34, Figs. 1 and 6$^A$, which has a pawl 35, with one end pivotally attached to the top thereof, which pawl engages with the notches of ratchet-wheel 22, the hook of pawl 35 being normally always out of engagement with the ratchet-wheel, as shown in Fig. 6$^A$, there also being a detent 36, which is normally out of contact with ratchet-wheel 22, but which will change position to hold the same in its forward step-by-step movements at the proper time, as hereinafter shown.

In the modification shown in Fig. 16, which has been used in some form in several auxiliary switches, the ratchet-wheel 22$^A$ is insulatingly mounted upon shaft 2 to revolve loosely thereon, same as ratchet 22, Fig. 9, and ratchet-wheel 22$^A$ may be operated by the same form of pawl as 35 and held by the same form of detent as 36 and held against the detent and pawl and revolved backward in release by a spring 28$^A$, attached to cord 28$^B$, same as 28 and 28', Figs. 1 and 2, but instead of the wipers 26 and the contact-strips 27, hereinbefore described, there is attached to one end of the ratchet-wheel 22$^A$ a switch-arm 26$^B$, and upon the opposite end of the ratchet-wheel winds the metal cord 28$^B$, which is connected to release-spring 28$^A$, whose electrical connection with the other parts of the exchange is the same as hereinbefore described for spring 28 and cord 28'. Again referring to the modification Fig. 16, a piece of insulating material is attached to the frame of the exchange and is provided with a series of contact-points 27$^B$, arranged in circular form and adapted to be successively contacted by the end of switch-arm 26$^B$ as it is revolved step by step by the action of the ratchet-pawl on ratchet-wheel 22$^A$, and the wire connections with the contact 27$^B$ are the same in their electrical connections as the wires which communicate electrical current from the strips 27, hereinbefore described.

In Fig. 18 are two views of detent 8', together with an attached arm 8", whose free end 38 is bent at a right angle, so that when the detent is in position the portion 38 has a position outside of lever 10, as shown in Figs. 2, 6$^C$, 19, 19$^A$, and 19$^B$, there being a short pin 40 projecting from lever 10, which serves at the proper time to hold up the arm 8" and 38 and release detent 8' from ratchet-wheel 8.

Lever 10 has an arm 39, which projects inwardly and is contacted at the proper time by a crooked wire 16', Figs. 17, 17$^A$, 19, and 19$^A$, which forms a tailpiece of pawl 16 and serves to release the pawl from engagement with ratchet-cylinder 15. Pawl 11 of lever 10 is normally held out of contact with ratchet 8 by means of an arm 41, which contacts a wire 42, Figs. 2, 3, 4, and 19, when lever 10 is in initial position.

Wire 42 is attached to a post 43, and a portion of the free end of the wire is bent outwardly at a right angle, Figs. 3, 4, and 5, which portion is contacted by an arm 16" of pawl 16 to hold the pawl out of engagement with ratchet-cylinder 15 for another purpose and at another time than what has been described in regard to the tailpiece-wire 16', acting upon projection 39 of lever 10.

At 44, Figs. 3, 4, and 5, is a spring which bears downwardly upon the arm 8" of detent 8' to hold the detent in contact with the ratchet-wheel 8.

Detent 36, which engages ratchet-wheel 22, is secured to the end of a short shaft 45, and this detent is held in contact with the ratchet-wheel by means of a spring 46, and at 47 is an arm, Fig. 5, which has its free end bent at a right angle and rests upon arm 8" of detent 8', so that whenever arm 8'' is lifted detent 36 is released from engagement with ratchet-wheel 22.

Figs. 2, 7, and 7^A show a pendent arm 48, which is attached to and electrically insulated from the frame of the exchange, but the lower end thereof is normally in contact with a spring-arm 49, which arm is attached at one end to a screw 50, which electrically connects it with the frame of the exchange. At 51 is a U-shaped wire having the free end flattened, the other end being attached to a screw 52, which also holds spring-contact 14 and forms electrical communication between these two parts, Figs. 1, 2, and 15.

Fig. 8 is a bell-crank cut-out lever 53, which is shown in position in Figs. 2 and 6^B, pivotally mounted upon screw 50, one arm of this lever being bent downwardly, Fig. 2, and in contact with spring-wire 49, while the remaining arm, Fig. 6^B, is in contact with the front edge of magnet-lever 18, so that when the armature of lever 17 is drawn to magnet 18 the bell-crank lever moves wire 49 inwardly out of contact with pendent arm 48 and into contact with the flattened portion of the bent wire 51.

At 10', Figs. 1, 2, and 6^C, is an arm secured at one end to the base of lever 10, which is actuated by electromagnet 9, so that whenever pawl 11 is actuated to revolve shaft 2 by virtue of electromagnet 9, the arm 10' presses inwardly and serves to also move wire 49 inwardly out of contact with pendent arm 48 and into contact with the flattened portion of bent wire 51, which action is the same as above described for one arm of the cut-out lever 53, which is operated by lever 18 and serves for a similar purpose.

The signal-key system particularly adapted to this exchange comprises a base-plate 57, Figs. 20 and 20^B, of insulating material, having keys of spring metal 54, 55, and 56, each secured at one end to this base. Secured to and insulated from these keys is a bent strip of metal 58, and crossing above the series of keys is a bar 59, of insulating material, to which is secured a series of short strips of metal 60, each insulated from the other, and when the keys are in proper position the bent strips 58 normally contact and connect the several strips 60, as is shown in Fig. 20^B, but should one of the keys be depressed, as shown in Fig. 20^E, the strips 60 will be disconnected. At the under side of the base-plate 57 is a strip of metal 61, to which is electrically connected the three contact-plates 62, 63, and 64, plate 61 being connected to one pole of battery 65 by wire 65'. In practice these signal-keys are designated as "hundreds," "tens," and "units" keys, and are usually marked, as shown in Fig. 20, respectively, H, T, and U.

Wire 66 connects the hundreds and units keys and wire 67 connects the units-key with magnet 9 in the exchange, Figs. 1 and 2, and with the telephone by connected wire 67', and wire 68 connects the tens-key with magnet 17, through the frame of the exchange. Wire 69 connects one end of a series of strips 60 with the telephone, and wire 70 connects the other end of a series of strips 60 with electromagnet 17, also through the frame of the exchange. Wires 68 and 70 are connected usually at the same place on the exchange-frame. Wire 71 connects magnets 9 and 17 with the opposite pole of the battery 65 from that connected with wire 65'.

On Sheet 5 of the drawings is shown in detail a system of mechanism which serves in combination with the electromagnets of the exchange and with the peculiar combination of trips for the pawls and detents to cut out the telephone and automatically release the mechanism of each exchange, so the operative parts are returned to the initial position after two telephones have been connected, as hereinafter explained.

Fig. 21 shows a lever 72, which is pivoted at one end to vibrate vertically, and at the other end is shown suspended therefrom an ordinary telephone-receiver, whose weight is sufficient to hold the lever in the initial position shown against the resiliency of spring 73.

Secured to one side of lever 72 is a metal contact-arm 74, Figs. 22 and 22^A, which is bent outwardly at its free end and which has attached thereto a piece of insulating material 75 to form the whole of one side near the end of the arm and a part also of the opposite side, both ends of the insulating-piece being formed into a wedged shape, as shown.

At 72' is a wire which electrically connects lever 72 and the contact-arm 74 with wire 65' from battery 65, Fig. 24.

At 76 and 77, Fig. 21^B, are shown two strips of metal which are secured at one end to a piece of material which insulates one from the other at this end, while at the opposite ends are formed projections which are normally in contact and electrical communication. At 78 and 79 are shown two other strips similarly secured and similar in shape to strips 76 and 77, but are placed in a reversed position relative to strips 76 and 77. Strips 76 and 77 are adapted to make and break electrical communication through wire 67', which has an end thereof attached to strip 76 and another end attached to strip 77.

Strips 78 and 79 are adapted to make and break electrical communication through wire 70, which has an end attached to strip 78 and another end attached to strip 79, the strips having sufficient resiliency to permit the wedge-shaped piece of insulating material 75 with the end of arm 74 to pass down between the free inwardly-projecting ends of the strips and first successively operate each pair of strips and then successively communicate electric current from wire 72' to one strip 76 of the first pair and then to one strip 78 of the second pair, then respectively and successively cut out communication from strips 76 and 78 with wire 72', strips 77 and 79 being always cut out from electrical connection with wire 72', so that no current from battery 75' ever reaches the telephone, and this mechanism, in connection with the release of the exchange, so that the several parts will automatically move back to the normal or initial position, is hereinafter referred to and more fully explained.

In Fig. 24 are diagrammatically represented six banks of interconnecting wires 12, the first and last wires only of each bank being shown, but it must be understood that between these first and last wires many others may be placed in groups of ten in the same plane and parallel therewith, similar to what is shown in Fig. 1, and in combination with Figs. 3, 4, and 5 banks Nos. 1, 2, 3, 4, 5, and 6 are represented, respectively, by the space between the wires 12.

Each telephone exchange is provided with a series of rotary and longitudinally-movable connectors 4, each insulated from the other, though connected together to move simultaneously, and each of these connectors is provided with wipers 7, Fig. 23, in electrical connection therewith, there being one connector for each bank of one hundred wires for each exchange, and electrical communication may be made from each connector journal-bearings 6 to the telephone-line, through wires 80, 81, 82, 83, 84, and 85 to the metal strips 27, thence to the wipers 26 to spring 28, and then through wire 40' to pendent wire 48 on the frame of the exchange, which is normally connected with the telephone-line. Through the frame of the exchange each of the bank-wires 12 is connected to an insulated arm 87 of some particular exchange by a wire 87', Figs. 3, 4, and 5, this arm being initially in contact with an arm 88, which projects from the shaft to and is in electrical connection with the frame of the exchange.

Shaft 2 is always rotated one step at the beginning of its cycle of movements before any of the wipers 7 or 26 contact respectively either of the wires 6 or metal strips 27.

This exchange may be operated a variety of ways, although but one way is herein shown and described, which comprises in the train of mechanism therefor the peculiarly-constructed keyboard, (shown in detail in the drawings on Sheet 4,) the keys and connections therewith being so constructed and placed relatively to each other and so wired that but three keys are necessary to accomplish the results intended. To illustrate the manner of operating the exchange through the action of these signal-keys, suppose the subscriber desires to call telephone 399. He first presses the key H, which indicates hundreds, three times, which causes a flow of three different currents of electricity from battery 65 through wire 65', key H, and wire 66, and then wire 67 to magnet 9, which operates pawl 11, and then through the shaft 2, which turns one step of ratchet-wheel 8, because it can engage at first only one tooth, which is represented by the pin 11', Figs. 1, 19, 19$^A$, and 19$^B$; but since the thrust-teeth 32, Figs. 11, 3, 4, and 6$^C$ are in line of the movement of lever 10 the ratchet-pawl 35, Fig. 6$^A$, is operated to turn ratchet-wheel 22 three steps successively, when the third wiper 26 thereof will be in contact with the third metal strip 27, which is electrically connected by a wire 82, Fig. 24, with the third wiper-shaft 4, and held in this position against the pull of the spring 28 by detent 36. After this the key T is pressed down nine times, each time making connection whereby a current passes from battery 65 through wire 65', key T, and wire 68, to magnet 17, through the frame of the exchange, when pawl 16 is operated to engage the teeth of the ratchet-cylinder 15 nine times, and is held in this operated position by detent 19, after which key U is pressed down nine times, making connection each time with battery 65, through wire 65', key U, and wire 67 to magnet 9 and causes pawl 11 to operate shaft 2 through ratchet-wheel 8 nine steps, which causes the ninth switch-arm of each of the different wiper-shafts 4 to contact some wire 12; but since only the third bank of wires is in electrical connection with the exchange through journal-bearings 6, wire 80, the third strip 27$^A$, the third wiper 26$^A$ of the auxiliary switch, then cord 28', spring 28, and wire 48' to pendent arm 48, attached to the frame of the exchange, the third wiper-shaft 4$^A$, Fig. 24, serves as a switch, with the wiper now in electrical connection with wire 399, when, if the telephone-receiver is lifted from its suspension-lever 72, the lever assumes the upper position, (shown in Fig. 21 in the broken lines or in Fig. 24,) when the strips 76 and 77 will spring together and connect wire 67', and strips 78 and 79 spring together and connect wire 70, which wires complete an electrical circuit from wire 69 and the telephone through the wire 60' and springs 58 under the signal-keys (see Figs. 20$^B$ and 20$^C$) to wire 70, thence to the central station, into the frame of the exchange, which forms a terminal for wire 70, (see Fig. 2,) thence through bell-crank lever, Fig. 53, and spring-arm 49, to pendent arm 48, and wire 48' to spring 28 and wire rope 28' to metal pulley 24, and wiper 36 of the auxiliary switch, then to one of the contact-bars 27, thence by a wire 80, Fig. 1, to one of bearing-posts 6 of shaft 4, to one of the wipers 7 in contact with an interconnecting arm 12, thence by wire 12 into one of the wires 87', Figs. 3, 4, 5, and 24, thence to the exchange of the station to be spoken to, the wire 87' connecting with the pin 87, (see Figs. 1, 2, 3, and 4,) then connecting arm 88 and shaft 2 and the frame of the exchange belonging to the telephone set to which the spoken message is intended.

After the conversation is ended the automatic release mechanism is operated as follows: The telephone-receiver is hung upon the hook at the free end of lever 72, when gravity causes the lever to descend to the position shown in the solid lines in Fig. 21, but the attached contact-arm 74 in passing down first opens the upper strips 76 and 77, and since the head at the free end of the contact-arm is faced with insulating material on the side next to the strip 77 no electric current will pass over the attached wire 67' to the telephone set, but a current will pass from battery 65 through 72' and the lever 72 and arm 74 into strip 76, and thence over wire 67' to magnet 9, which will be operated and cause the projection 39 of lever 10, Figs. 14 and 19, to contact the under side of the tailpiece 16' of pawl 16 of lever 18 and release pawl 16, when lever 10 is in the position shown in Fig. 19, and while lever 10 is held in this position the arm 74, Fig. 21, passes still farther down until the lower strips 78 and 79 are first opened, as shown in Fig. 21ᶜ. Then strip 78 is contacted with the side of arm 74, while the opposite strip is in contact with the insulation at the side of the arm 74, so that no current can pass through wire 70 from that side or direction, but electric current passes from arm 74 out through strip 78, and thence to magnet 17, which causes lever 18 to assume the position shown in Fig. 17ᴬ, the lower convex portion of tailpiece 16' thereof riding upon projection 39 of lever 10, causing a still further movement of pawl 16, and the tailpiece 16', contacting with a cross-rod 8'', connected with pawl 8', causes this pawl to release, and shaft 2, being now free, first revolves around backwardly until pin 88 near the outer end, Figs. 1 and 2, strikes against the insulated pin 87 and then slides longitudinally to the initial position, similar to what has been before described in the Letters Patent hereinbefore referred to.

A special cut-out mechanism is shown in Figs. 1, 2, 6ᴮ, 6ᶜ, and 8, and consists, as has already been partially described, of bolt 52, insulated from the frame of the exchange, Figs. 1 and 2, to which bolt, on the lower side, is attached a U-shaped wire 51, and above a spring 14, which spring is adapted to connect the pin 13. (Better seen in Figs. 3 and 4.) Also in intimate connection therewith is the arm 88 at the extreme end of shaft 2, which is adapted to contact, when in the initial position, the pin or arm 87, which is insulated from the frame of the exchange to which it is secured.

Near the bolt 52 is insulatingly secured to the frame of the exchange the pendent arm 48, and attached to the lower end of a pendent pin 50 is one end of a horizontally-disposed spring-wire 49, whose front end is normally in contact with pendent arm 48, so that normally pendent arm 48 is in electrical communication with the frame of the exchange, and therefore with the line-wire 70, and is always in communication with wire 48', as before stated.

The bar upon which lever 10 vibrates has an upwardly-projecting arm 10', which crosses spring-wire 49, and an arm of elbow-lever 53, with a downward projection which crosses spring-wire 49, so that when either of the levers 10 or 18 is operated these arms force spring-wire 49 out of contact with pendent arm 48 and into contact with the lower free flat end of the U-shaped wire 51. It will be understood that when the magnets 9 and 17 are not energized the free end of spring-wire 49 is always in contact with the pendent arm 48, in which position there may pass an electric current from line-wire 70 through the frame of the exchange to and through bolt 52, then spring-wire 49, pendent arm 48, wire 48', and thence, as explained, to the wipers of some electric shaft 4, and thence to some one of the interconnecting wires 12, thence to the telephone-exchange and telephone of the person spoken to, and this circuit is used for telephone purposes entirely, from the pendent arm 48 to the telephone spoken to, and when in the normal condition, with the spring-wire 49 in contact with pendent arm 48, wire 70 is in communication with wire 48', so that two distant telephones, through their respective exchanges, are in communication with each other, and in the operation of the exchange the end of spring-wire 49 is always forced away from the pendent arm 48 to the U-shaped contact-terminal 51.

Magnet 9 always operates lever 10 first and causes arm 10' thereof to press spring-wire 49 in contact with U-shaped contact-terminal 51, when a current may descend over line-wire 70 to the frame of the machine, thence by shaft 2, pin 13, spring 14, U-shaped terminal 51, thence by wire 70 to magnet 17, or vice versa, as the current may flow, all of which is for the purpose of preventing a heavy battery-current from reaching the interconnecting wires 12 or any part of the telephone set of the party speaking or of the party being spoken to, or any other telephone set in connection with any of the wires 12.

It will be particularly observed that the purpose of the springs 58 on the signal-keys 54, 55, and 56 are for the purpose of connecting the several strips 60 so that wires 69 and 70 are in circuit when the keys are in the normal position, so that a telephone-circuit may be made over wires 69 and 70; but as soon as either of the keys are operated they first cut out connection between wires 69 and 70 and afterward connect wires 67 or 68 with the battery 65, but not with the telephone, and which serves another purpose in reducing both the number of line-wires and the number of signal-keys necessary to operate an exchange.

There are various ways of arranging the spring-arm 74 and substitutes for the contact-strips 76 and 77 and 78 and 79 to accomplish the result, as hereinbefore described, and it must be understood that we do not confine ourselves to this exact construction.

It will be observed that when the telephone-lever 72 rises by virtue of spring 73, after the removal of the telephone-receiver, the end of arm 74 does not successively pass through between the free ends of strips 78 and 79 and 76 and 77, but it passes up outside of strips 78 and 76, as shown in Fig. 21^F, with the insulated piece 75 in contact with the strips, so that no current of electricity is communicated in any direction from wire 72'.

It can be seen in Fig. 21^B that the upper edges of the lips or projections of the free ends of the contact-strips 76, 77, 78, and 79 are not only rounded, but flare outwardly, so as to preserve a V-shaped space, into which may easily enter the V-shaped-lever end of the head 75, of insulating material, at the end of frame 74, the springs on two sides clasping the head closely in the downward passage thereof when the telephone is hung upon its hook at the end of lever 72; but in the ascent the upper end of the piece of insulating material 75 being beveled to one side and the lower pair of strips 78 and 79 being in close contact and strips 78 having a shorter head than strips 79 the arm 74 is sprung outwardly to permit the back of the head 75 to ride over the outside of the strips, as before explained. Arm 74 should be made of very thin material in order not to produce an undue amount of friction when moving upwardly, in order that a comparatively weak spring may be used at 73 and also to save wear upon the back of insulation at 75.

In case this automatic release device should become deranged the release may be accomplished with the signal-keys by first pressing upon the U or units key and holding it down until the T or tens key is pressed, when the units-key may be released, and then the tens-key released, the shaft 2 in the meantime successively revolving and sliding back to initial position.

Having thus described our invention, what we claim as new, and desire to secure by Letters Patent, is—

1. The combination with a series of wires or contacts of a series of rods or parts, each insulated from the other, and each carrying angularly-displaced contact arms or wipers, means for rotating the rods step by step to bring the arms thereof into engagement with the wires, and a selector for connecting a line-wire with either of the said rods, substantially as described.

2. The combination with a series of wires or contacts, of a series of rods or parts, each insulated from the other and each carrying contact arms or wipers, means for imparting to the rods a step-by-step longitudinal motion, and means for rotating the rods step by step to bring the arms thereof into engagement with the wires and a selector for connecting a line-wire with either of the said rods substantially as described.

3. The combination with a series of wires or contacts, connected respectively with the telephone-lines, of a series of rotating rods or parts, each insulated from the other, and each carrying angularly-displaced contact arms or wipers, connected with one of the telephone-lines, an electromagnet controlled from the subscriber's station, mechanism operated by the electromagnet, for rotating the rods step by step to bring the arms thence into contact with the wires, and a selector connecting a line-wire with either of the said rods substantially as described.

4. The combination with a series of wires or contacts, connected respectively with the telephone-lines, of a series of rotating rods or parts, each insulated from the other, and each carrying contact arms, or wipers, connected with one of the telephone-lines, an electromagnet controlled from the subscriber's station, mechanism operated thereby for moving the rods longitudinally step by step, a second electromagnet controlled from the subscriber's station, mechanism operated thereby for rotating the rods step by step to bring the arm into contact with the wires, and a selector connecting a line-wire with either of the said rods substantially as described.

5. The combination with a series of wires or contacts, of a series of rotating rods or parts each insulated from the other, and each carrying angularly-displaced contact arms or wipers adapted to make contact with the wires, a ratchet-wheel mounted to rotate with the rods, an electromagnet, a pawl operated by the electromagnet adapted to engage the ratchet-wheel to rotate the rods step by step, and a selector connecting a line-wire with either of said rods substantially as described.

6. The combination with a series of wires or contacts, of a series of rotating rods or parts, each insulated from the other and each carrying angularly-displaced contact arms or wipers adapted to make contact with the wires, a rack mounted to move with the rods, an electromagnet, a pawl operated thereby and adapted to engage the rack to move the rods longitudinally step by step, a ratchet-wheel mounted to rotate with the rods, an electromagnet, a pawl operated thereby and adapted to engage the ratchet-wheel to rotate the rods step by step, and a selector connecting a line-wire and either of said parts substantially as described.

7. The combination with a series of rods, each insulated from the other, and each rod carrying contact-arms, of an electromagnetic device for moving the rods longitudinally step by step, an electromagnetic device for rotating the rods step by step, a selector connecting a line-wire with either of said rods, and mechanism controlled by the electromagnetic devices for releasing the rods and returning the same to their original position, substantially as described.

8. The combination with a series of rotating rods each insulated from the other, a number of series of wires corresponding to said rods, a selector for connecting a line-wire with either of said rods, and each carrying contact-points, of a ratchet-wheel mounted on the driving-shaft thereof, an electromagnet and a pawl controlled thereby for rotating said ratchet-wheel, a detent or dog engaging the ratchet-wheel to prevent backward rotation, a rack provided upon the driving-shaft, an electromagnet and a pawl controlled thereby for moving the rack longitudinally, a detent or dog engaging the rack to prevent backward movement of the same, and means controlled by electromagnet for removing the detent from engagement with the ratchet-wheel and rack, and returning the rods to their original position, substantially as described.

9. The combination, with a series of contact arms or wipers, of a selector, a cut-out for the selector, two terminals insulated from each other, one of which is in electrical connection with the wipers and the other one in connection with the cut-out, a contact movable between said terminals and normally in engagement with one of them, two magnets, and means for moving the contact from one terminal to the other when one of the magnets is energized, substantially as set forth.

10. The combination, with a series of contact arms or wipers, of a selector, a cut-out for the selector, two terminals insulated from each other, one of which is in the talking-circuit and the other one is in the operating-circuit, one of the terminals being electrically connected with the wipers and the other one in electrical connection with the cut-out, a contact movable between said terminals and normally in engagement with one of them, and means for moving the contact from one terminal to the other, substantially as set forth.

11. The combination, in an automatic telephone-exchange provided with an operating and a talking circuit, of two terminals one of which is in the talking-circuit and the other one is in the operating-circuit, of a contact movable between the terminals, a lever, one end of which is adapted to engage with the contact, and two magnets, the armature of one of which is provided with means for moving the lever whenever said magnet is energized, substantially as set forth.

12. In an automatic telephone-exchange, the combination with a rotary shaft, of an elongated ratchet-wheel secured thereon, one end of the ratchet-wheel having a reduced portion, a pin projecting radially from said reduced portion, a lever, a magnet for operating said lever, and a pawl on the lever for initially engaging with said pin and rotating the shaft one step, substantially as set forth.

13. The combination in an automatic telephone-exchange provided with a plurality of electromagnets, of a series of substations in circuit with the exchange, yielding contact-points in each of the electromagnet-circuits, a movable holder for the receiver permanently connected with one of the wires of the electromagnet-circuits, a contact upon the arm, a circuit-breaker in front of the contact-point, said parts being so arranged that when the receiver is placed in position the holder will be moved and the circuit-breaker and the contact-points will be passed between the yielding contact-points, substantially as set forth.

14. The combination in an automatic telephone-exchange provided with a plurality of electromagnets, of a series of substations in circuit with the exchange, a movable holder for the receiver, in permanent contact with one of the wires of the electromagnet-circuits, pairs of yielding contact-points in a line with the path of the holder, a contact-point upon the holder adapted to be passed between each pair of yielding contact-points, the distance between said pairs of contact-points being such that the contact-points upon the holder may be in engagement with one point of each pair of points at the same time, and a circuit-breaker in front of said contact-points upon the arm, substantially as set forth.

15. The combination in an automatic telephone-exchange provided with a plurality of electromagnets, of a series of substations, a pair of yielding contact-points in the circuit of each of the electromagnets, a movable holder for the receiver, a plate upon the holder, and a piece of insulating material upon the plate, one end of which projects in front of the plate and is adapted to be passed between the yielding contact-points, and the plate is adapted to engage consecutively and simultaneously with one of the points of each of the pairs of yielding points, substantially as set forth.

In testimony that we claim the foregoing we have hereunto set our hands, this 28th day of June, 1895, in the presence of witnesses.

ALMON B. STROWGER.
FRANK A. LUNDQUIST.
JOHN ERICKSON.
CHARLES J. ERICKSON.

Witnesses:
  M. VAN MEHREN,
  B. W. JOHNSON.